US006564314B1

(12) United States Patent
May et al.

(10) Patent No.: US 6,564,314 B1
(45) Date of Patent: *May 13, 2003

(54) COMPUTER INSTRUCTION COMPRESSION

(75) Inventors: Michael David May, Bristol (GB);
Andrew Craig Sturges, Bristol (GB);
Nathan Mackenzie Sidwell, Bristol (GB)

(73) Assignee: SGS-Thomson Microelectronics Limited, Almondsbury Bristol (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/472,515

(22) Filed: Jun. 7, 1995

(30) Foreign Application Priority Data

Jun. 21, 1994 (GB) ............................................... 9412434

(51) Int. Cl.[7] .............................................. G06F 15/00
(52) U.S. Cl. ..................................................... 712/210
(58) Field of Search ................................ 712/200, 208, 712/210, 220

(56) References Cited

U.S. PATENT DOCUMENTS

| 3,275,989 A |   | 9/1966  | Glaser et al. ............ 340/172.5 |
|-------------|---|---------|-------------------------------------|
| 3,626,374 A |   | 12/1971 | Chinlund ................. 340/172.5 |
| 4,241,397 A |   | 12/1980 | Strecker ..................... 364/200 |
| 5,249,273 A |   | 9/1993  | Yoshitake et al. ........... 395/375 |
| 5,420,923 A | * | 5/1995  | Beyers et al. ................. 380/20 |
| 5,434,568 A | * | 7/1995  | Moll ............................ 341/87 |
| 5,440,701 A | * | 8/1995  | Matsuzaki et al. .......... 395/386 |
| 5,463,746 A | * | 10/1995 | Brodnax et al. ............. 395/587 |

FOREIGN PATENT DOCUMENTS

| EP | 0 073 424   | 3/1983 | ............. G06F/9/30 |
| EP | A-2 073 424 | 3/1983 | ............. G06F/9/34 |
| EP | A-0 380 849 | 8/1990 | ............. G06F/9/38 |

OTHER PUBLICATIONS

Motorola, MC68030 User's Manual, Prentice–Hall, 1989, p. 3–35.*
The 14th Annual International Symposium on Computer Architecture, Jun. 1987, Pittsburg, PENN, US pp 309–319, D.R. Ditzel, et al. "The Hardware Architecture of the CRISP Microprocessor".
Patent Abstracts of Japan, vol. 18, No. 153 (P–1709) Mar. 14, 1994 & JP–A–05 324 314 Hitachi, Ltd.

* cited by examiner

*Primary Examiner*—David Y. Eng
(74) *Attorney, Agent, or Firm*—Wolf, Greenfield & Sacks, P.C.; James H. Morris; Robert A. Skrivanek, Jr.

(57) ABSTRACT

A computer system has compact instructions avoiding the need for redundant bit locations and needing simple decoding. Logic circuitry is arranged to respond to an instruction set comprising a plurality of selectable instructions of different bit lengths. Each instruction is based on a format of predetermined bit length and a predetermined sequence of instruction fields each of a respective predetermined bit length. Some instructions omit a selected one of the fields and include an identifier of less bit length than the omitted field to indicate which field is omitted. Thus this bit length of the instruction is compressed. The logic circuitry is operable to restore the omitted field on execution of the instruction.

20 Claims, 7 Drawing Sheets

COMPUTER INSTRUCTION COMPRESSION

FIELD OF THE INVENTION

The invention relates to compressed instructions for a computer system and methods of using a computer system with compressed instructions.

BACKGROUND OF THE INVENTION

The manner in which computer instructions are encoded is important as it will affect the bit length of instructions, and thereby code density, as well as the speed of decoding the instructions during an execution sequence for the instructions. It also affects the memory access time needed to fetch the instructions.

Common operations by a processor in a computer system require identification of one or more sources of data to form an input to the processor as well as a destination for receiving the result of operating the processor. Conventional reduced instruction set computers (RISC devices) have used instructions all of a common bit length and format defining both the operation to be carried out by the processor as well as identification of two sources of data for use in the operation as well as a destination for the result of the operation. Such instructions have been used to manipulate data that is found in addressable store locations such as registers or memory. Such instructions of the same size usually have little variation in format and consequently simplify the decoding operation. However when using a processor in a pipelined operation to execute a sequence of instructions it may be necessary to hold a plurality of live data items which are accessible by subsequent instructions and this requires sufficient number of addressable locations to be identified by an instruction that it imposes a limit on the shortness of the instructions that can be used. Furthermore, a number of instructions may not necessarily require the full range of register addresses that can be handled by a single instruction and consequently the fixed length instructions may unnecessarily increase the bit length of an instruction. This means that the memory capacity needed to hold an instruction sequence as well as the memory accessing time needed to obtain a sequence of instructions can be unnecessarily increased.

Other systems are known with complex instructions, (CISC devices). Long instructions have provided the facility for identifying the addresses of more data stores used for holding live data during the pipelined processing of an instruction sequence. However such long instructions have required greater access time in obtaining the instructions from memory and may involve more extensive decoding needing more cycles of operation to achieve decoding of each instruction.

It is an object of the present invention to provide a computer system with compact instructions avoiding the need for redundant bit locations and allowing simple decoding of instructions.

It is a further object of the invention to provide a computer system having variable length instructions some of which are compressed to avoid redundant bit locations.

It is a further object of the invention to provide a system for expanding compressed instructions for use by a processor in a computer system.

SUMMARY OF THE INVENTION

The invention provides a computer system having logic circuitry arranged to respond to an instruction set comprising a plurality of selectable instructions of different bit length, each instruction being based on a format of predetermined bit length and a predetermined sequence of instruction fields each of a respective predetermined bit length, wherein some instructions omit a selected one of said fields and include an identifier of less bit length than the omitted field to indicate which field is omitted, thereby compressing the bit length of the instruction.

Preferably each instruction includes control bits in addition to said instruction fields.

Preferably said control bits provide an indication of the length of the instruction and identify which fields are present or omitted from the instruction.

Said control bits may provide an indication of the designation of data in one or more of said fields.

Preferably said selected one of said fields which is omitted is an identifier for a data holding location. Said data holding location may be a register.

In some embodiments said selected one of said fields which is omitted is an identifier of a first in first out data store arranged to hold simultaneously a plurality of data values. In this way a single address in an instruction may indicate a storage location for holding a plurality of live data values.

Preferably the omission of any selected field designates an implicit storage location not requiring address data in the instruction, and said logic circuitry is arranged to access said implicit storage location in response to the omission of the or each omitted field. Preferably said implicit storage location comprises a first in first out data store arranged to hold simultaneously a plurality of data values. In this way a plurality of live data values may be held during the operation of the sequence of instructions without increasing the number of address bits provided in each instruction.

Commonly said instruction fields in said format of predetermined bit length provide indications of two data source locations and a data destination location thereby indicating the source of data for use in execution of the instruction and the destination of a result of execution of the instruction.

Each instruction may have a bit length equal to an integral number of bytes and each field may have a bit length less than one byte.

The present invention also provides a method of compressing instruction bit length in a computer system which method comprises storing in a data store a plurality of instructions of variable length, each instruction being based on a format of predetermined bit length and a predetermined sequence of instruction fields each of a respective predetermined bit length, wherein some instructions are formed with omission of at least one selected said field and indicate which field or fields are omitted by an identifier of less bit length than the omission, thereby compressing the bit length of the instruction.

The present invention also provides a method of generating instructions for use in a computer system arranged to execute instructions selected from an instruction set comprising a plurality of instructions each based on a format of predetermined bit length and a predetermined sequence of instruction fields each of a respective predetermined bit length, which method comprises inputting instructions wherein at least some are compressed by omission of at least one field and include an identifier of less bit length than the omitted field to indicate which field is omitted, decoding said identifier and expanding the bit length of the instruction to restore the omitted field, and outputting the expanded instructions.

The invention also provides a method of operating a computer system comprising executing a plurality of instructions selected from an instruction set comprising a plurality of selectable instructions of different bit length, each instruction being based on a format of predetermined bit length and a predetermined sequence of instruction fields each of a respective predetermined bit length, wherein some instructions omit at least one selected said field and include an identifier of less bit length than the omitted field to indicate which field is omitted, thereby compressing the bit length of the instruction.

An embodiment of the present invention will now be described by way of example and with reference to the accompanying drawings.

DESCRIPTION OF THE PREFERRED EMBODIMENT

Figure 1:
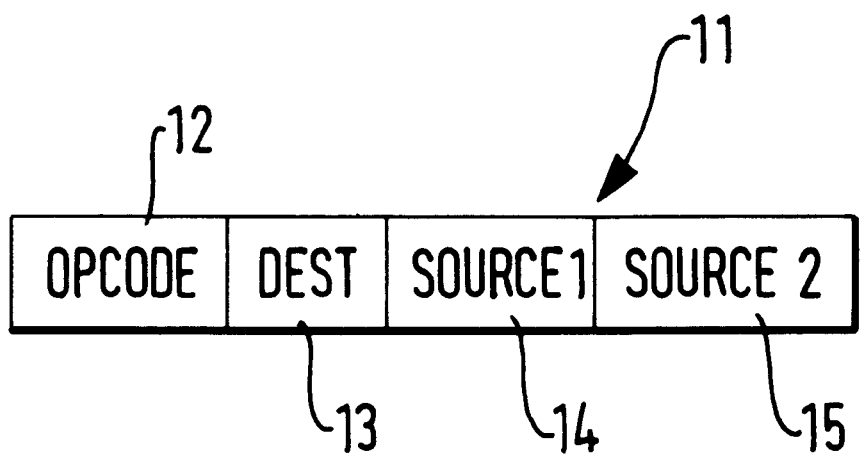
FIG. 1 shows the format of a prior art instruction.

FIG. 1 shows an instruction format for a conventional RISC processor system in which all instructions have a fixed length and generally similar format of bit locations in the instruction. The example shown consists of a single instruction 11 which in this example is 4 bytes long each byte being 8 bits long. The first byte 12 defines the opcode which defines the particular operation to be carried out by the processor when executing this instruction. The second byte 13 provides the address of the destination for the result of carrying out this instruction. Bytes 14 and 15 designate respectively the addresses of first and second sources of data to be used in carrying out the instruction. Typically bytes 13, 14 and 15 will all designate register addresses. Such instructions are simple to decode and thereby avoid unnecessary decoding time. However, many operands in instructions of this type are the addresses of temporary registers. Various proposals have been made to limit the number of addresses needed for temporary registers including for example the use of an accumulator with a field in each instruction specifying whether or not an operand identifies an accumulator or an explicit register. This may result in fixed length instructions of the type shown in FIG. 1 having a number of redundant bit locations. This results in reduction of code density in that the bit locations needed to hold an instruction sequence are unnecessarily increased thereby taking up more memory space and taking up more memory access time in obtaining the instructions for use by the processor.

Figure 2:
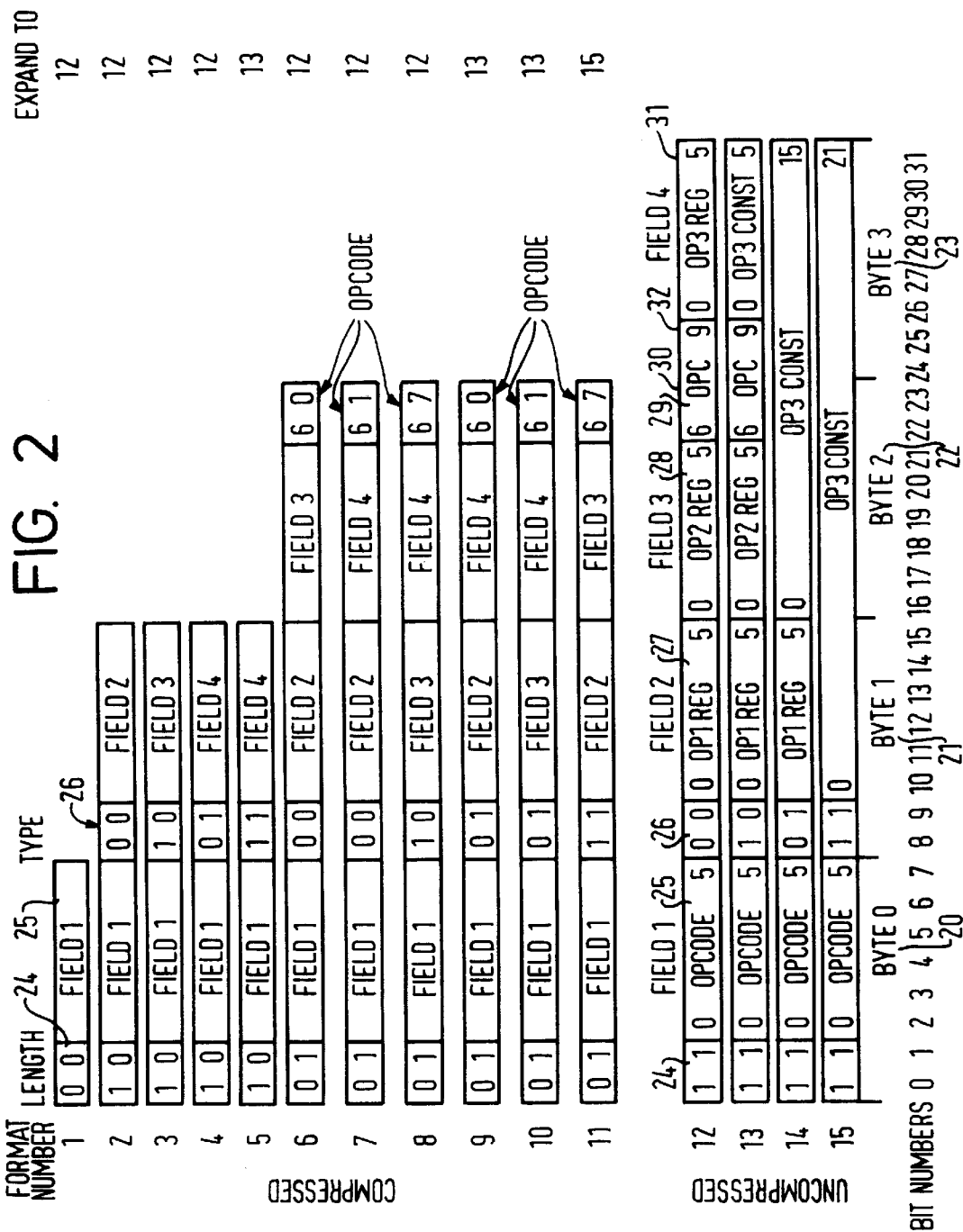
FIG. 2 shows a variety of instruction formats for use in accordance with the present invention.

The present invention uses an instruction set providing variable length instructions. In the preferred example described a variety of formats of instruction for use by a single processor is shown in FIG. 2. This particular example uses a plurality of selectable instructions of different bit length, each being based on a format of predetermined bit length and a predetermined sequence of instruction fields each of a respective predetermined bit length, some of the instructions omitting a selected one of the fields and including an identifier of less bit length than the omitted field to indicate which field is omitted, thereby compressing the bit length of the instruction and avoiding the use of redundant bit locations in the instructions. In this particular example shown the instructions are based on a 32 bit format divided into 4 bytes 20, 21, 22 and 23 each of 8 bits. This format will be described with reference to format 12 shown in FIG. 2 as this illustrates the basic uncompressed format. The first byte 20 has the first two bit locations allocated to a length indicator 24. The next 6 bits form field 1 which is an opcode indicator 25 indicating the particular operation which the processor is to carry out in response to execution of the instruction. The first field in the instruction format is provided for all instructions at the same bit locations and always indicates the opcode.

In the second byte 21 the first two bit locations form an indicator 26 indicating the type of instruction. These two bits 26 taken together with the instruction bit length indicator 24 provide an indication of which fields are present and which have been omitted in the instruction. The next 6 bits of the second byte 21 form a second field 27. In the third byte 22 the first 6 bits define a third field 28. The last two bits 29 and 30 can, depending on the type of instruction, provide extensions of the opcode indicator or type of instruction indicator or part of a constant. In the fourth byte 23 the last 6 bits form the fourth field 31. The first two bits 32 of the last byte 23 may form part of constant values or extensions of the opcode indicator. FIG. 2 shows 15 different formats which may all be based on the four field format shown in format 12 of FIG. 2. Each of the selectable formats either fully includes or fully omits each of the second, third or fourth fields. The type indicator 26 (and extension bit 30) in combination with the length indicator 24 provides an indication of which fields have been omitted. They may also provide an indication of the designation of data in an included field thereby indicating a register or a constant value. In addition to allowing compression of the bit length of each instruction to avoid redundant bits, this example allows the identification of an implicit data storage location which does not require explicit addressing. The basic format of the instructions used is best illustrated by reference to format 12 in FIG. 2. The length indicator 24 indicates that it is a 32 bit long instruction. The opcode 25 defines the operation to be carried out. The type indicator 26 indicates that in the case of a 32 bit long instruction the second field 27 will identify the address of a destination register, the third field 28 will identify the address of a second source register and the fourth field 31 will identify the address of a first source register. The last two bits of the third byte 22 and the first two bits of byte 23 will in this case provide the facility for an extension 32 of the opcode 25. For some instructions it is not necessary to identify two source addresses and a destination address and in such cases one or more of the second, third or fourth fields can be omitted so as to compress the bit length of the instruction and avoid redundant bit locations. Furthermore, the example described includes the use of an implicit data store for holding live data during a program execution sequence where the data store does not require any explicit addressing. In this example the implicit store is provided by a first in first out data store arranged to hold simultaneously a plurality of data values and in this example such a data store is referred to as a pipe. The pipe may be used as a destination or as a first or second source of data, or any combination of them, for use in execution of the program sequence. If the pipe is to be used for any of the destination, source 1 or source 2 addresses then no entry is required in the corresponding second, third or fourth fields of the instruction format shown in FIG. 2. In the case of format 1 the instruction length indicator 24 indicates that the instruction is only 1 byte long and consequently fields 2, 3, and 4 are missing thereby indicating that the implicit pipe is to be used for both source and destination addresses. In the case of formats 2, 3, 4 and 5, the bit length indicator indicates that the instruction is now 2 bytes long and the type indicator 26 distinguishes between formats 2, 3, 4 and 5. In format 2 field 2 indicates a destination address. In format 3 field 3 indicates a second source address and in format 4 field 4 indicates the first source address. In each of formats 2, 3 and 4 the implicit pipe is understood to replace the omitted addresses. When expanded each of formats 1 to 4 will take the form of format 12. Format 5 shows a situation where the type indicator shows that field 4 provides a constant value instead of a first source address. Format 5 will be expanded to format 13. Formats 6 to 11 each have a length indicator 24 indicating that the instructions are 3 bytes long and the type indicators 26 together with the last bit location 30 indicate the significance of the included fields as well as an indication of the omitted field. In each case the implicit pipe is used in place of any omitted address. Formats 6, 7 and 8 will be expanded to format 12. Formats 9 and 10 will be expanded to format 13. Format 11 will be expanded to format 15. In the case of formats 12 to 15 the length indicator indicates that the instruction has a length of 4 bytes. In the case of formats 13, 14 and 15 the instruction omits one or more explicit addresses and the bit locations are replaced by constants 33 or 34 or 35. On expansion the implicit pipe address will be provided for each missing field. In the subsequent description the bit value provided by bits 10–15 is referred to as Arg 1, the bit value of bits 16–21 is Arg 2 and the bit value of bits 26–31 is Arg 3. Eight examples of instruction having 1, 2 or 3 Arguments are illustrated in the following table which also shows the source and destination addresses indicated by each of these instructions as well as the byte length and format corresponding to FIG. 2.

TABLE A

| Example | Format | Destination | Source 2 | Source 1 | Byte Length |
|---|---|---|---|---|---|
| 0 | 1 | PIPE | PIPE | PIPE | 1 |
| 1 | 2 | ARG 1 | PIPE | PIPE | 2 |
| 2 | 3 | PIPE | ARG 1 | PIPE | 2 |
| 3 | 4 | PIPE | PIPE | ARG 1 | 2 |
| 4 | 6 | ARG 1 | ARG 2 | PIPE | 3 |
| 5 | 7 | ARG 1 | PIPE | ARG 2 | 3 |
| 6 | 8 | PIPE | ARG 1 | ARG 2 | 3 |
| 7 | 12 | ARG 1 | ARG 2 | ARG 3 | 4 |

It will therefore be seen that in the compressed instruction formats shown in FIG. 2 the type indicator 26, including when appropriate the extension 30, has a bit length substantially less than the omitted fields 2, 3 and 4. The use of predetermined field positions each of predetermined bit length provides simplicity and thereby speed in decoding. Each instruction is compressed to a minimum bit length to indicate the information necessary for execution of the instruction. Consequently memory space for storing an instruction sequence and access time for transferring instructions from memory to the processor are minimised. Each instruction fetch operation from memory will load into the processor a fixed number of bytes and in the case of compressed instructions the overall byte package fetched from memory may include part of a subsequent instruction occupying bit locations unused by the next instruction.

The pipe address may be given as an explicit address in an included field when desired.

Figure 3:
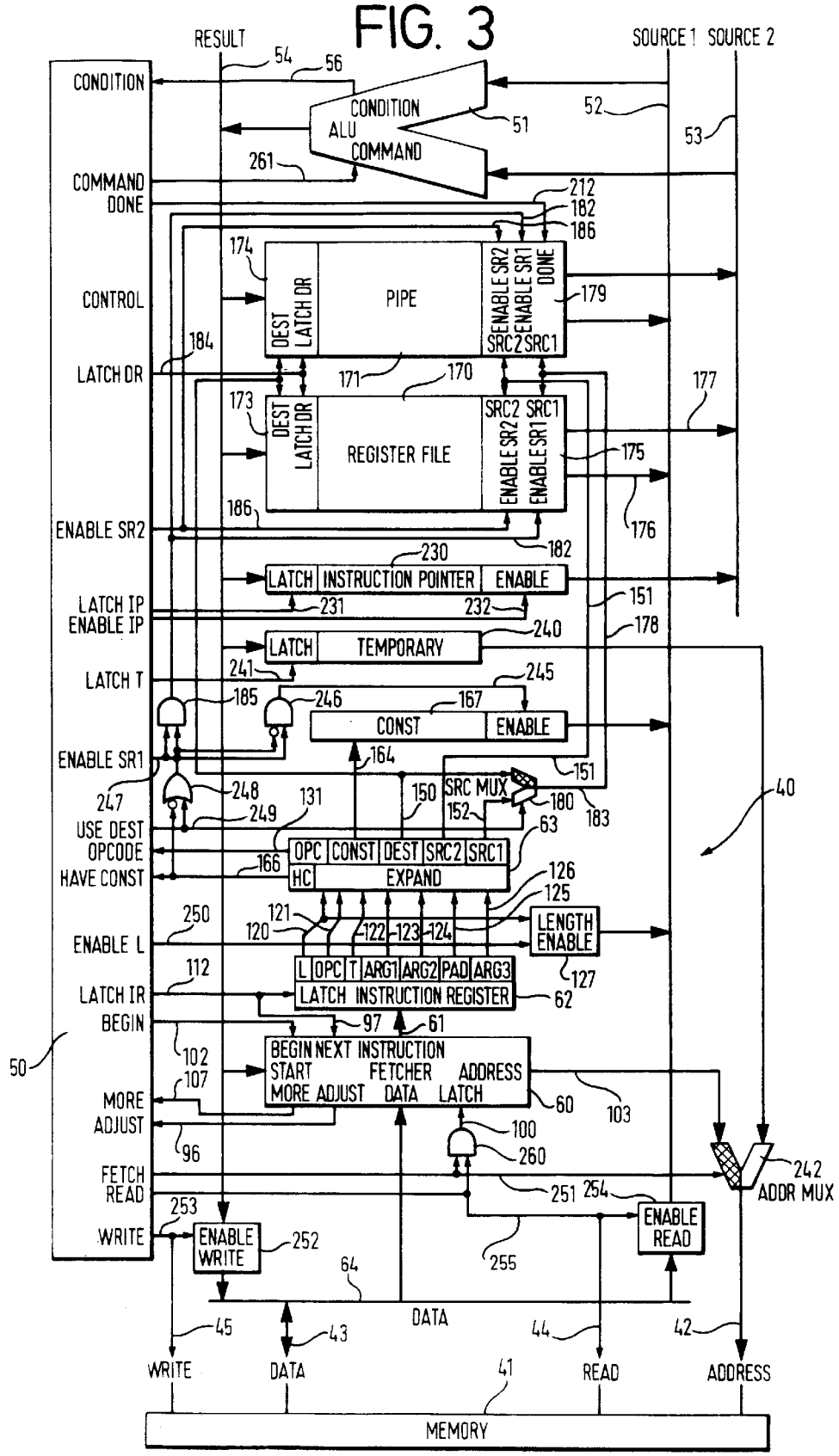
FIG. 3 is a block diagram of a computer system in accordance with the present invention.

A computer system for use in executing instructions of the type shown in FIG. 2 is illustrated in FIG. 3. This shows processor circuitry 40 coupled to a memory 41 which in this example comprises a conventional RAM. The processor 40 includes an address bus 42, a data bus 43 as well as read and write controls 44 and 45 respectively, all coupled to the memory 41. The memory 41 is arranged to hold program comprising sequences of instructions at different addressable locations. Each instruction conforms to one of the formats already described with reference to FIG. 2. The memory 41 may also hold data. The processor 40 includes control logic 50 as well as an ALU 51. The data bus 43 carries data values to and from the memory 41. The address bus 42 carries memory address values for read or write operations. Each addressable location in the memory 41 holds 4 bytes of data. The least significant 2 bits of address bus 42 are ignored in determining which memory location to access. The ALU 51 is connected to a source 1 bus 52 and a source 2 bus 53. These form inputs to the ALU 51 and any resulting output is provided on a result bus 54. Read and write lines 44 and 45 form outputs from the control circuit 50. When the read line 44 is asserted the memory 41 supplies to the data bus 43 the value stored at the location identified by the address bus 42. When the write line 45 is asserted the memory 41 will store the value on the data bus 43 into the memory location identified by the address bus 42.

The ALU 51 receives a command input 261 from the control unit 50 to determine which operation the ALU is to perform. The ALU provides a condition output 56 to the control unit 50 to indicate the condition of the ALU operation.

The processor 40 includes an instruction fetching unit 60 arranged to fetch 4 bytes at a time from the memory 41 and to provide a 4 byte output 61 to an instruction register 62 where the output 61 is aligned with the beginning of an instruction. The instruction register 62 is arranged to provide a plurality of separate outputs representing each of the fields and control bits of an instruction to an expand circuit 63 which is arranged to provide a fully expanded output for each instruction. Depending on the opcode of the instruction, the control unit 50 will cause source values to be put onto one or both source buses 52 and 53 from either the register file 170 or pipe 171 or constant register 167. The result of an ALU operation will then be written from the result bus 54 into a selected location of either the register file 170 or pipe 171 depending on the destination indicated by the instruction. The ALU 51 is also used for intermediate stages of instruction execution and the result may be written to the Instruction Pointer 230, the Temporary Register 240, the Fetcher 60 or the Write Buffer 252.

Figure 4:
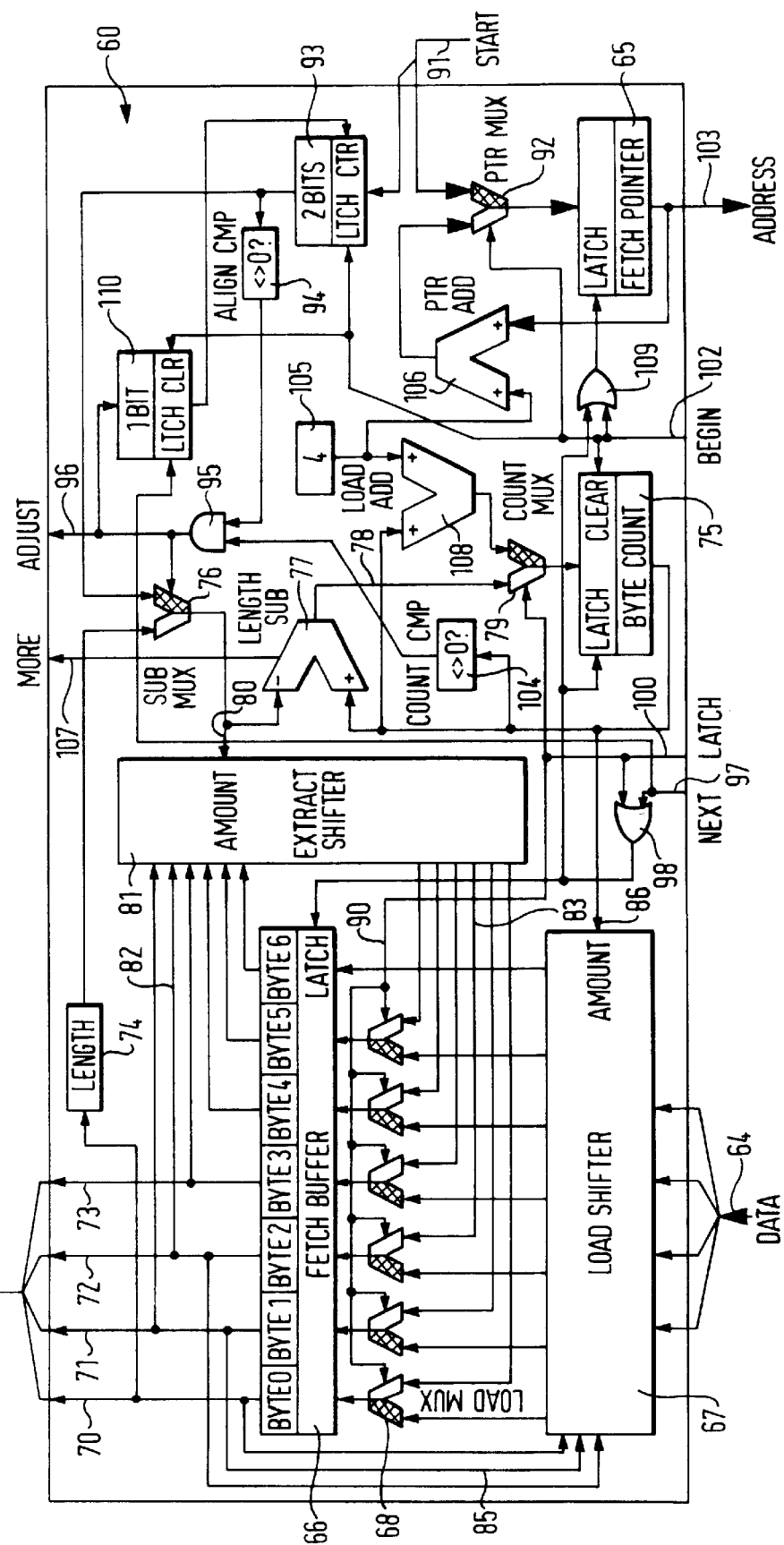
FIG. 4 shows more detail of part of the instruction fetcher shown in FIG. 3.

The construction and operation of the instruction fetcher 60 will be described first. The unit is shown in more detail in FIG. 4 and has an input data bus 64 which is connected to the data bus 43. The fetcher 60 includes a fetch pointer 65 which comprises a 32 bit latch containing the next address in memory from which a 32 bit word is to be read. When a value is read from memory, latch 65 is increased by 4 bytes to a new pointer address. A value 4 is generated by unit 105 which supplies the value 4 to an adder 106 which receives the pointer value from bus 103 and adds 4 to it. The total is then sent through multiplexer 92 to the latch 65 to update the pointer. It will be understood that an aligned instruction is one which has its bit 0 position at the beginning of a new 32 bit word. However due to the use of variable length instructions some instructions will commence partway through a word in memory. The fetcher 60 is arranged to read compressed instructions from memory and to correctly align them and then output them on bus 61 from a fetch buffer 66 to the instruction register 62. The 4 byte words which are input on bus 64 pass through a load shifter 67 through a plurality of parallel multiplexers 68 to the fetch buffer 66. The fetch buffer may hold up to 7 bytes of instructions which is sufficient to hold the worst case of instruction misalignment. A 4 byte instruction could start 1 byte into a 32 bit memory word such that the word contains 3 bytes of the instruction and a subsequent word of 4 bytes must be read in order to obtain the 4th byte necessary to complete the instruction. In this way 7 bytes need to be held in the buffer 66. Once an instruction is aligned in the buffer 66, four bytes are output on lines 70, 71, 72 and 73 representing byte 0, byte 1, byte 2 and byte 3. Depending on the length of the instruction it may be that the instruction buffer 62 does not act on signals derived from all four lines 70–73 but in all cases outputs are provided on these lines. Byte 0 will indicate on line 70 the length of the instruction which is output and this is fed through a length indicator 74 to indicate to the fetcher unit 60 how many bytes in the buffer 66 can now be removed. A byte counter 75 holds a count of the number of bytes in the buffer 66 at any one time and the length signal derived from unit 74 is passed through a multiplexer 76 to a length subtractor 77 which receives inputs from multiplexer 76 and from the byte counter 75 in order to calculate the number of valid bytes remaining in the buffer 66. An output 78 from the subtractor 77 is supplied through a multiplexer 79 to update the input in the byte counter 75. The output from the multiplexer 76 forms an input 80 to an extract shifter 81 which is used to relocate in the buffer 66 those remaining bytes which will be required for use in the next instruction to be supplied on bus 61 to the instruction register 62. The extract shifter 81 receives inputs 82 from each of lines 71, 72, 73 as well as from the byte 4, byte 5 and byte 6 locations of the buffer 66. Depending on the Amount signal 80, the values held in the fetch buffer 66 are relocated by the extract shifter 81 and output on lines 83 to the multiplexers 68. In this way the bytes which are still required in the fetch buffer are relocated into the fetch buffer 66 at new locations starting at byte 0. The values held in byte 0, 1 and 2 of the buffer 66 are also fed back on lines 85 to the load shifter 67. The load shifter also receives an amount signal 86 derived from the byte counter 75 to indicate the byte locations within the fetch buffer 66 into which new bytes read from memory on data bus 64 are to be loaded. Depending on the Amount signal 86, four new bytes from memory are input on bus 64 and fed to the appropriate multiplexers 68 in combination with any signals on lines 85 giving byte values which are to be retained from a previous operation of the fetch buffer 66 so that the multiplexers 68 can be operated by a latch signal 90 to load into the buffer 66 the combination of retained bytes on any of lines 85 together with new bytes read from memory such that they occupy consecutive byte positions in the fetch buffer 66 starting at byte 0. The latch signal 90 is also fed to the multiplexer 79 to update the byte counter 75 by four. The value 4 is fed from unit 105 to an adder 108 which adds 4 to the byte count fed in from the byte counter 75 and feeds the total to the byte counter 75.

Normally the fetch pointer 65 will cause the fetcher 60 to obtain instructions from sequential word locations within memory. However some programs will contain branch instructions requiring the mechanism to start fetching instructions from a new location in memory. For this reason a Start input 91 is provided which can be fed through the multiplexer 92 to the fetch pointer 65. The top 30 address bits of the start address on line 91 are fed to the pointer 65 as those 30 bits will always address the beginning of a new 4 byte word in memory. The bottom two bits of the Fetch pointer 65 are always set to zero. The bottom 2 bits which will only indicate a sub-position within a 32 bit word are stored in a 2 bit latch 93. The value held in the latch 93 is tested in a comparator 94 to detect inequality with zero and thereby decide whether or not the new memory address does start at the beginning of a 32 bit boundary or partway through a word. In the event of it starting partway through a word a signal is provided from the comparator 94 to the AND gate 95 to indicate, when a second input to the AND gate 95 from a comparator 104 indicates that the number of bytes in the buffer 66 is not zero, that some adjustment of the contents of the fetch buffer is necessary. An Adjust output 96 is provided to the control unit 50 indicating that the instruction is not correctly aligned and to align it a dummy instruction read is carried out using a Next signal 97 from the control unit 50. The signal 97 is fed through an OR gate 98 to cause a new latching operation for the fetch buffer 66 which as described above will cause removal of one or more bytes from the fetch buffer 66 and relocation by an amount determined by the input 80 to the extract shifter 81, the amount being derived from the two bit latch 93 which is routed through the multiplexer 76 by the output of the AND gate 95.

It will be appreciated that the Next input 97 is also derived from the control unit 50 to inform the fetcher unit that the current instruction has been read from the fetch buffer 66 and consequently that instruction can be removed from the Fetch buffer 66 as described above. A latch input 100 is derived from the control unit 50 which is an edge sensitive signal to instruct the fetcher to store the value on the data bus 64 into the buffer 66. A Begin signal 102 is a further edge sensitive signal used to inform the fetcher to start fetching a new word from a new address presented on the Start signal input 91 in response to a branch instruction. It will be appreciated that the address output 103 always points to a 32 bit boundary at the beginning of a word in memory. The byte counter 75 is connected to the count comparator 106 to provide a signal to the AND gate 95 provided the byte count is not 0. The length subtractor 77 is arranged to provide a More output 107 whenever the fetch buffer has insufficient content to produce the next instruction. This signal 107 is supplied to the control unit 50 to cause the fetcher to perform a memory read using the latch signal 100 before the next instruction can be read from the fetcher. The byte counter 75 has the count reduced whenever an instruction is removed from the fetch buffer 66 and increased whenever a new value is read from memory. When the fetcher starts from a new instruction sequence using the Start input 91, the Begin signal on line 102 is used to clear the count in the counter 75, and via an OR gate 109 is used to latch new pointer values in the fetch pointer 65. A single bit latch 110 is used to clear the 2 bit latch 93 after the first instruction from a new start address has been aligned in the buffer 66.

It will be understood that the three input signals Next 97, latch 100 and Begin 102 which are derived from the control unit 50 are not usually asserted until some operation of the fetcher is required. The four types of operation which it may perform are as follows. It may produce instructions on the output bus 61 to the instruction register 62. It will do this when a correctly aligned instruction is held in the fetch buffer 66 and the More Signal 107 and Adjust signal 96 are not asserted. The fetcher may perform a read operation from memory locations. Normally 32 bit memory locations are read sequentially whenever the fetch buffer 66 does not contain enough data. The address for which data is read will be indicated by the fetch pointer 65 output on bus 103. This will be done when the More signal 107 is asserted and the Adjust signal 96 is not asserted. The latch signal 100 will be asserted to set the multiplexers 68 to select outputs from the load shifter 67. Once data is input from bus 64 the latch signal 100 is deasserted in order to store the value in the fetch buffer 66.

The fetcher can be used to initialise a new instruction sequence. In this case the byte count 75 is cleared and a new address in memory is latched into the fetch pointer 65 and 2 bits buffer 93. This initialisation will be required after a program branch instruction. It is performed by asserting and then deasserting the Begin signal 102. Furthermore, the fetcher can be used to align the first instruction in a new instruction sequence. If a new instruction sequence does not start at a 32 bit word boundary in memory then the Adjust signal 96 will be asserted and the alignment operation will involve asserting and then deasserting the Next signal 97 in order to perform a dummy read of the fetch buffer 66, and thereby align the first instruction of the new sequence. As shown in FIG. 3, the output bus 61 of the fetcher unit 60 provides a 32 bit signal which is fed into the instruction register 62 and the 32 bit value is latched by an input signal 112 which is derived from the control unit 50 at the same time as the Next signal 97 which was fed to the fetcher 60. The 32 bit signal in register 62 is arranged to provide seven output signals 120, 121, 122, 123, 124, 125 and 126. The nature of these output signals will be described with reference to FIG. 2. Signal 120 represents bits 0 and 1 corresponding to the length indicator in FIG. 2. Signal 121 is derived from bits 2 to 7 and represents field 1 which contains the opcode. Output 122 represents bits 8 and 9 which form the type indicator 26 shown in FIG. 2. Output 123 is Arg 1 representing bit positions 10 to 15. Output 124 is Arg 2 representing bit positions 16 to 21. Output 125 represents bit positions 22 to 25 and is referred to as PAD and represents a type extension, part of the opcode or part of a constant value. Output 126 represents Arg 3 and represents bit positions 26 to 31. It would therefore be seen that output 121 represents field 1 in FIG. 2 and always indicates the opcode. Fields 2, 3 and 4 referred to in FIG. 2 will be represented by either Arg 1, Arg 2 or Arg 3 depending on the length of the instruction. Each of the outputs 120–126 are fed to an instruction expansion unit 63 which is arranged to reconstruct the full instruction from the compressed form supplied to it. The length indicating output 120 is also fed to a length enable unit 127 connected to the Source 1 bus 52.

The construction and operation of the expansion unit 63 will be described with reference to FIG. 5. A unit 130 is provided to construct the full opcode. Unit 130 receives the opcode input 121 and is also connected to the PAD input 125 as in some formats the PAD signal may include an opcode extension. The length input 120 and type input 122 are both connected to the unit 130 in order to determine whether the unit 130 incorporates any signal from the PAD input 125 in constructing the opcode. The fully constructed opcode is then output on line 131 which is fed to the control unit 50 to control the operation carried out by the processor. A router unit 132 is arranged to receive each of the Arg 1, Arg 2 and Arg 3 inputs 123–126. The router 132 also receives inputs from the length and type signals 120,122 so as to determine which of the inputs 123, 124 and 126 represent Destination or Source 1 or Source 2 outputs. The router 132 also received the PAD signal 125 as in some formats this contains a TYPE extension. The router 132 has a first output 140 corresponding to a destination address a second output 141 corresponding to a Source 2 address and a third output 142 corresponding to a Source 1 address. The length and type inputs 120 and 122 and PAD input 125 which are fed to the router 132 enable the router to output the correct input signals 123 to 126 or the respective outputs 140 to 142 and these are fed to respective multiplexers 143, 144 and 145. The multiplexers each receive an alternative address indicating the pipe address determined by a pipe addressing unit 146. The operation of the multiplexers 143–145 is controlled by an enable unit 147 having inputs from the length and type indicators 120 and 122 and PAD 125. Those input signals determine whether or not any of the fields in the compressed instruction are missing and it replaces any missing field by the implied pipe address 146. In this way output signals 150, 151 and 152 from the expansion unit indicate an appropriate destination address Source 1 and Source 2 address with the pipe address being provided for any implied address not explicity given in the compressed instruction. In the event that the instruction includes a constant value as is indicated in the formats of FIG. 2, then any of Arg 1, Arg 2 and Arg 3 as well as PAD may be used to construct the constant dependent on the length and type indicators 120 and 122. These are fed to a constant constructor 163. If the input signals 120 and 122 indicate that a constant is to be constructed the inputs 123 to 125 are combined as required to output a constant value on output 164. The length and type indicators 120 and 122 are also fed to an indicator unit 165 to output a signal 166 indicating that a constant is present. Signal 166 is fed to the control unit 50 and the constant value is fed a line 164 to a constant register 167. When the PAD signal 125 contains a TYPE extension, its value does not determine whether a constant is encoded as is shown in FIG. 2.

The processor includes a register file 170 holding a set of addressable registers. In addition the implied data storage location is provided by the pipe 171 which provides a first in first out data store for a plurality of data values. The register file 170 has a pointer circuit 173 connected to the bus 54 to allow data values to be written into the register file. Similarly the pipe 171 has a selector circuit 174 to allow data values to be written from the result bus 54 into a desired location in the pipe 171. Both the pointer circuit 173 and selector circuit 174 are arranged to receive a latch signal 186 from the control unit 50 when it is required to write data into a storage location. Similarly both the pointer 173 and selector 174 are connected to the output 150 of the instruction expansion unit 63 so that the appropriate store is used as a destination for data when so indicated by the output of an expanded instruction from the expansion unit 63. To allow data to be read from the register file 170 onto the source buses, an output selector 175 is provided which is connected by line 176 to the source 1 bus 52 and by a connection 177 to the source 2 bus 53. The correct register for use in a read operation is determined by the source 1 or source 2 addresses provided by the expansion unit 63. Line 151 provides a direct connection of the source 2 address to both the output selector circuit 175 of the register file 170 and to an output selector circuit 179 of the pipe 171. The source 1 address which is output on line 152 from the expansion unit 63 passes through a multiplexer 180 having its output connected to both selectors 175 and 179. The multiplexer 180 also has an input from the destination line 150 from the expansion unit 63 so that the destination address can be supplied in place of a source 1 identification. The selector 175 has a first enable input 182 to enable a read operation onto the source 1 bus. The enable signal 182 is derived from the control unit 50 through an AND gate 185. A second enable input 186 is arranged to enable a read operation onto the second source bus 53 and is derived directly from the control unit 50. The enable inputs 182 and 186 are similarly provided to the output selector 179 of the pipe 171.

The construction and operation of the register file 170 is conventional.

The construction and operation of the pipe 171 will be described in more detail with reference to FIG. 6. The pipe 171 comprises a plurality of separately selectable data stores 190 arranged to hold N data values. The result bus 54 is connected to each of the data stores 190 and the destination selector 174 is coupled to each data input to determine which data store may accept an input from the result bus 54. Similarly each data store 190 is collected to two separate output selectors 191 and 192. The two output selectors are similar and are each connected to each data store location and may connect any one of the data locations to the respective source 1 bus 52 or source 2 bus 53. When writing to the pipe the destintation signal 150 is input to the pipe where the destination address is compared in a match unit 194 with a designated address for the pipe to ensure that the instruction requires use of the pipe as the destination. It will be understood that the destination signal will also be fed to the input selector for the register file 170 but will be ignored by the register file 170 as no match will be found. Provided a match is found by unit 194 an input is provided to AND gate 195 also arranged to receive the latch signal unit 184 from the control unit 50 so that the relevant destination is only selected when the correct latch signal is asserted as well. The selector 174 operates in a cyclic manner to write data into successive data locations of the pipe 171. An In Pointer 196 always contains the address in the pipe 171 of the next entry to write to. This address is input on line 197 to the selector 174 so as to select the required address for the next writing operation. Signal 197 is also fed to an adder 198 having as a further input a signal from an Add 1 unit 200. The output of the adder is fed back to the pointer circuit 196 which receives a latching signal from the AND gate 195 so as to advance the pointer address by one after each new latching operation to write data into the pipe 171. When a value is to be written into the pipe, the latch signal 184 is initially asserted. The output of the AND gate 195 is fed to a latch circuit 201 in the pipe 171. When the latch signal 184 is deasserted the value of the result bus 54 is stored in the selected location of the pipe 171 and the address of the next entry to write to is stored in the pointer 196.

During a read operation, the source 1 and source 2 addresses on lines 151 and 183 are fed to the register file 170 and to the pipe 171. As the designated pipe address will not match an address in the register file 170 reads from the pipe will be ignored by the register file 170. The input addresses are compared in the pipe 171 with designated addesses of the pipe in further match units 205 similar to match unit 194. The output of each match unit 205 is fed to an AND gate 206 which receives the respective enable input 182 or 186. In the case of the source 1 circuitry, the output of the AND gate 206 forms an enable signal 207 to the source 1 selector 190 as well as an input to an OR gate 209 and an AND gate 210. An Out Pointer circuit 211 is arranged to receive a Done signal 212 from the control unit 50. The pointer 211 holds the address of the location 190 in the pipe 171 from which the next entry is to be read. The output 215 from the pointer is fed to a first adder 216 and to a second adder 217. Adder 216 allows a value of 1 to be added to the signal and fed to a multiplexer 218 under the control of an output signal from the OR gate 209. The other adder 217 is arranged to add a value of 2 to the signal on line 215 and provides an output 220 which is an increment of 2 to the output signal 215 for the pointer circuit 211. A multiplexer 221 controlled by an output from the AND gate 210 controls the input 223 to the pointer circuit 211 such that the pointer receives either an input from line 220 which is an increment of 2 in the location to be read from or alternatively an output from the multiplexer 218. The output of the multiplexer 218 may either be the output signal 215 itself with zero increment or alternatively an increment of 1 effected by the adder 216. In operation to effect a read from the pipe 171, the source 1 output. 52 is defined to be accessed before source 2 output 53 should both be active. For this reason the output pointer value 215 is fed directly to the output selector 192 to select the pipe location to be read from when appropriate signals are received on inputs 182 and 183. The signal on line 207 will determine whether a read operation is effected to the source 1 bus 52 and that signal is also fed to a multiplexer 220 to select either the output signal 215 from the pointer 211 or alternatively the increment of 1 produced by the adder 216 in order to provide the location selection which is input on line 221 to the selector circuit 191. In this way, a read operation may be effected on source bus 53 when appropriate input signals are provided on inputs 186 and 151. The selector 191 will output from the location indicated by line 215 from the pointer 211 if no read operation was effected onto the source 1 bus 52. If however the signal on line 207 had caused a read operation onto source 1 bus 52 then multiplexer 220 will be operated to increment by 1 the location from which the read operation is effected by selector 191 onto source 2 bus 53. The output signal from AND gate 206 which is used to cause a read operation onto the source 2 bus is also fed to the OR gate 209 to control the multiplexer 218 and AND gate 210 to control the multiplexer 221 in advancing the location indicated by the pointer 211 for the next read operation. If no read operation occurred the output signal 215 from the pointer 211 is fed back through multiplexers 218 and 221 with no change in location. If a read onto only one source bus occurred then the output of adder 216 is fed through multiplexers 218 and 221 to advance the pointer location by 1. If a read operation occurred onto both source buses 52 and 53 then the location identified by the pointer 211 is advanced by 2 by using the output of the adder 217 fed on line 220 through multiplexer.

In addition to the circuitry already described, the processor of FIG. 3 includes an instruction pointer register 230 which holds the address of the next sequential instruction. It is not used to fetch instructions from memory as this is carried out by the fetcher circuit 60 already described. The instruction pointer register 230 is connected to the result bus 54 and may be used to latch an instruction address when a latch signal 231 is input from the control unit 50. Similarly, when an enable signal 232 is provided from the control unit 50 the value in the register 230 will be output onto the source 2 bus 53.

A temporary register 240 holds an intermediate address for use in accessing memory. It may store an address from the result bus 54 when a latch signal 241 is provided from the control unit 50. The value in the temporary register 240 is fed to an address multiplexer 242 which supplies onto the address bus 42 leading to the memory 41 either the address 103 which is output from th e instruction fetcher or the address derived from the temporary store 240.

The constant register 167 can be used to hold a constant value output on line 164 from the expansion of an instruction and this value can be fed onto the source 1 bus 52 when an enable signal 245 is derived from a AND gate 246 arranged to receive the enable source 1 signal 247 from the control unit 50. Both the AND gate 185 and the AND gate 246 receive in addition to the enable signal 247 an input from a OR gate 248. These control whether the CONSTANT register 167 or the value derived rom Register file 170 or Pipe 171 is sent to the Source 1 bus 52. OR gate 248 receives one input from line 166 indicating that a constant is present in the expanded instruction and a second input 249 which is output from the control unit 50 to control the multiplexer 180 to use the destination field as a source 1 address. This, dependent on an opcode of an instruction, permits some instructions to use the destintation field to specify another source operand.

The length register 127 holds an indication of the length of the current instruction and this can be driven onto the source 1 bus 52 when an enable signal 250 is input from the control unit 50. This can be used to adjust the instruction pointer value which is held in register 230.

The address multiplexer 242 is controlled by a fetch control signal 251 from the control unit 50 so that the memory is addressed from the fetcher 60 or from the value in the temporary register 240.

A write buffer 252 is controlled by an enable signal 253 from the control unit 50 to drive the value on the result bus 54 onto the data bus 43 when signal 253 is enabled. Similarly a read buffer 254 is controlled by a read control signal 255 derived from the control unit 50 so that the value on the data bus 43 can be driven onto the source 1 bus 52 when signal 255 is enabled. The latch input 100 for the fetcher 60 is derived from AND gate 260 having as its inputs signals 251 and 255 from the control unit which are both enabled when a read from memory is required to fetch a further instruction word from memory.

In use, all control outputs from control unit 50 are initially deasserted. If the More output 107 from the fetcher 60 indicates that a further instruction word is required from memory 41 then a read operation is carried out to load another word into the fetcher 60. If the processor has branched to a new instruction sequence then an adjust output 96 will be provided to indicate whether alignment is necessary. If alignment is necessary another memory read for an instruction word may be necessary. The Move signal 107 will indicate if this is necessary. After alignment an instruction will be loaded into the instruction register 62, then expanded by unit 63 and an appropriate source or constant values will be supplied onto source 1 or source 2 buses 52 or 53 and an appropriate operation carried out by the ALU 51 under a command signal 261 from the control unit 50.

The processor may execute arithmetic instructions. In this case instructions may take two source values which may be from the pipe 171 register file 170 or constant register 167. These are specified by the output signals from the expansion unit 63. The ALU 51 produces a result which is fed to the result bus 54 and stored in the pipe 171 or register file 170 as specified by the destination signal derived from the expansion unit 63. Some operations will only have a single source operand and in this case the value on the source 2 bus 53 is ignored and the enable signal on line 186 is not asserted.

The processor may also execute memory instructions which read or write a 32 bit value to or from memory. The address to access in memory is calculated by adding two source values specified by the source 2 and source 1 or constant signals from the expansion unit 63. The value on the result bus 54 is stored in the Temporary Register 240 by signal 241. The location can be read by storing the result in the register file 170 or pipe 171. Alternatively the location can be written to by reading from the pipe 171 or register file 170 as specified by the destination signal 150 which is routed onto line 183 by the multiplexer 180. For both reading and writing the source 1 bus 52 is routed through the ALU 51 to the Result bus 54 by the correct Command signal 261.

In executing a branch instruction the processor may change the instruction pointer which is held in register 230 so that a different part of the program is executed. In an unconditional branch the instruction will always change the instruction pointer in register 230 to a new value. For a conditional branch a condition will be specified in order for the instruction pointer to be updated. If the condition is not met then the instruction pointer is updated to a point in the next sequential instruction as normal. Procedure calls may be effected as unconditional branches which save the address of the next sequential instruction in the register file 170 or pipe 171.

An instruction set which may be used in the example described is as follows:

TABLE B

| Opcode | Mnemonic | Operands | | | Name |
|---|---|---|---|---|---|
| 1 | mov | Result | | Value | Move |
| 2 | add | Result | Value1 | Value2 | Add |
| 3 | sub | Result | Value1 | Value2 | Subtract |
| 4 | mul | Result | Value1 | Value2 | Multiply |
| 5 | div | Result | Value1 | Value2 | Divide |
| 6 | ldv | Result | Base | Index | Load Vector |
| 7 | stv | Value | Base | Index | Store Vector |
| 8 | j | | | Target | Jump |
| 9 | jnz | Value | | Target | Jump Not Zero |
| 10 | call | Result | | Target | Call |
| 11 | eq | Result | Value1 | Value2 | Equal To |
| 12 | gt | Result | Value1 | Value2 | Greater Than |
| 13 | and | Result | Value1 | Value2 | And |
| 14 | or | Result | Value1 | Value2 | Or |
| 15 | xor | Result | Value1 | Value2 | Exclusive Or |
| 16 | sl | Result | Value | Amount | Shift Left |
| 17 | sr | Result | Value | Amount | Shift Right |

The operands are given descriptive names. Some instructions have less than three operands and they consequently have blanks for the omitted ones. It is understood that a special value will be given to these omitted operands which permit them to be eligible for omission in the compressed instruction. The uncompressed instruction format selected for an instruction (Formats 12 to 15) depends on the operands selected by the programmer. For instance the Move instruction could select a register or the pipe for the Result operand and a register, pipe or constant value for the Value operand. If the Value is not a constant, then Format 12 can be used. The Result address held in Field 2, a special value filled in for Field 3 and the Value address put in Field 4. If the Value operand is a constant then Formats 13 and 14 could be used, depending on the length of the constant. If the Value operand is a constant and the Result operand is the pipe, then Format 15 can be used, in addition to Formats 13 and 14. Once an uncompressed format has been chosen, it can be compressed as the FIG. 2 permits. A similar strategy can be used for the other instructions.

The values specified by Operand2 and Operand3 are put on the Source 2 bus 53 and the Source 1 bus 52 respectively. The instruction then performs its function. Finally the Result bus 54 will be stored in the location specified by the Result operand, if there is one.

The significance of these instructions is as follows:

Move The value on Source 1 bus 52 is copied to the Result bus 54.

Add The value on the Source 1 bus 52 is added to the value on the Source 2 bus 53 and the result is put on the Result bus 54.

Subtract The value on the Source 2 bus 53 is subtracted from the value on the Source 1 bus 54 and the result is put on the Result bus 54.

Multiply The value on the Source 1 bus 52 is multiplied by the value on the Source 2 bus 53 and the result is put on the Result bus 54.

Divide The value on the Source 1 bus 52 is divided by the value on the Source 2 bus 53 and the result is put on the Result bus 54.

Load Vector The value on the Source 2 bus 53 is added to the scaled value on the Source 1 bus 52 and the result is put on the Result bus 54. This is stored in the Temporary Register 240. A memory Read operation then occurs, and the memory value is put on the Source 1 bus 53. The ALU 51 passes this value though, unchanged, to the Result bus 54.

Store Vector The value on the Source 2 bus 53 is added to the scaled value on the Source 1 bus 52 and the result is put on the Result bus 54. This is stored in the Temporary Register 240. The value addressed by Operand 1 is put on the Source 1 bus 52 and the ALU 51 passes this value though, unchanged, to the Result bus 54. A memory Write operation then occurs, storing the value on the Result bus 54 into memory.

Jump The Instruction Pointer 230 is put on the Source 2 bus 53. If Operand 3 is a constant, the ALU 51 is set to perform an add, otherwise it is set to pass the Source 1 value thought unchanged. The Result bus 54 now holds the jump target value. This is written into the Fetcher 60 which is instructed to start fetching a new sequence of instructions.

Jump Not Zero The value addressed by Operand 1is put on the Source 1 bus 52 and the Condition signal 56 from the ALU 51 is checked to see if the Source 1 value is zero. If it is zero, then no further action is taken and the next sequential instruction will be executed. If the value is not zero, then the same actions as the Jump instruction occur.

Call The Instruction Pointer 230 is put on the Source 2 bus 53 and the ALU 51 set to pass this through to the Result bus 54. The Result bus value 54 is stored in the location specified by the Operand 1 address. Subsequently the same actions as the Jump instruction occur.

Equal To The value on the Source 1 bus 52 is compared with the value on the Source 2 bus 53. A value of 1 is put on the Result bus 54, if they are equal, otherwise a value of 0 is put on the Result bus 54.

Greater Than The value on the Source 1 bus 52 is compared with the value on the Source 2 bus 53. A value of 1 is put on the Result bus 54, if Source 2 is greater than Source 1, otherwise a value of 0 is put on the Result bus 54.

And The value on the Source 1 bus 52 is logically anded with the value on the Source 2 bus 53 and the result is put on the Result bus 54.

Or The value on the Source 1 bus 52 is logically ored with the value on the Source 2 bus 53 and the result is put on the Result bus 54.

Exclusive Or The value on the Source 1 bus 52 is logically exclusively ored with the value on the Source 2 bus 53 and the result is put on the Result bus 54.

Shift Left The value on the Source 1 bus 52 is shifted left (towards the most significant end) by the value on the Source 2 bus 53 and the result is put on the Result bus 54.

Shift Right The value on the Source 1 bus 52 is shifted right (towards the least significant end) by the value on the Source 2 bus 53 and the result is put on the Result bus 54.

It will be seen that instructions used in accordance with this example are compressed so that they may have a length of 1, 2, 3 or 4 bytes. The use of these compressed instructions provides greater code density and the comparison with a prior art instruction set of the type shown in FIG. 1 can be seen from the following examples where the heading 'Conventional' relates to instructions of the type shown in FIG. 1 and 'This Example' relates to the example described above. A '*' is used to designate the omission of an address in a selected field of the instruction, thereby indicating the use of the implicit pipe 171.

Single Addition of Registers

If the desired operations is, $$R3=R2+R1$$

where R1, R2 and R3 are register addresses denoting locations in the register file 170.

Conventional

A single instruction accomplishes the operation.

| No | Assembly |
|----|----------|
| 1  | addR3,R2,R1 |

THIS EXAMPLE

A single instruction accomplishes the operation.

| | | | | Encoding | | | | | |
|---|---|---|---|---|---|---|---|---|---|
| No | Assembly | L | T | Field 1 | Field 2 | Field 3 | Field 4 | PAD | Format |
| 1 | addR3,R2,R1 | 3 | 0 | Add | R3 | R2 | R1 | 0 | 12 |

As all operands must be supplied, this is encoded into four bytes.

Single Addition of Implicit Location

If the desired operation is to add two values, specified implicitly, and store the result in an implicit location.

Conventional

There is no meaning to this operation

THIS EXAMPLE

A single instruction accomplishes the operation.

| | | | | | Encoding | | | | |
|---|---|---|---|---|---|---|---|---|---|
| No | Assembly | L | T | Field 1 | Field 2 | Field 3 | Field 4 | PAD | Format |
| 1 | add*,*,* | 0 | | add | | | | | 1 |

As none of operands need be supplied, this is encoded in one byte.

Vector Addition

If the desired operation is $$Ra[Ri]=Ra[Ri]+Rb[Ri]$$

Where registers Ra and Rb hold the base addresses of two arrays and register Ri holds an index to use.

Conventional

Four instructions are required, using 16 bytes.

| No | Assembly |
|---|---|
| 1 | ldv R1,Ra,Ri |
| 2 | ldv R2,Rb,Ri |
| 3 | add R1,R1,R2 |
| 4 | stv R1,Ra,Ri |

THIS EXAMPLE

Four instructions are required, however some of the operands can be omitted, and so only ten bytes are required.

| | | | | | Encoding | | | | |
|---|---|---|---|---|---|---|---|---|---|
| No | Assembly | L | T | Field 1 | Field 2 | Field 3 | Field 4 | PAD | Format |
| 1 | ldv *,Ra,Ri | 2 | 1 | ldv | | Ra | Ri | 0 | 8 |
| 2 | ldv *,Rb,Ri | 2 | 1 | ldv | | Rb | Ri | 0 | 8 |
| 3 | add*,*,* | 0 | | add | | | | | 1 |
| 4 | stv *,Ra,Ri | 2 | 1 | stv | | Ra | Ri | 0 | 8 |

Equation Evaluation

If the desired operation is $$Ra=(Ra+Rb)\times(Rc+Rd)$$

where Ra, Rb, Rc and Rd are register locations.

Conventional

Three instructions encoded in 12 bytes and using two temporary registers are required.

| No | Assembly |
|---|---|
| 1 | add R1,Ra,Rb |
| 2 | add R2,Rc,Rd |
| 3 | mul Ra,R1,R2 |

THIS EXAMPLE

Three instructions are required, but as some operands can be omitted, 8 bytes are needed.

| | | | | | Encoding | | | | |
|---|---|---|---|---|---|---|---|---|---|
| No | Assembly | L | T | Field 1 | Field 2 | Field 3 | Field 4 | PAD | Format |
| 1 | add*,Ra,Rb | 2 | 1 | add | | Ra | Rb | 0 | 8 |
| 2 | add*,Rc,Rd | 2 | 1 | add | | Rc | Rd | 0 | 8 |
| 3 | mul Ra,*,* | 1 | 0 | mul | Ra | | | | 2 |

Interleavedf Equation Evaluation

If the desired operation is $$Ra=(Ra+Rb)\times(Rc-Rd)$$

$$Re=(Re+Rf)/(Rg-Rh)$$

Conventional

Six instructions and four temporary registers are required. This takes 24 bytes to encode.

| No | Assembly |
|---|---|
| 1 | sub R1,Rc,Rd |
| 2 | add R2,Ra,Rb |
| 3 | sub R3,Rg,Rh |
| 4 | add R4,Re,Rf |
| 5 | mul Ra,R2,R1 |
| 6 | div Re,R4,R3 |

THIS EXAMPLE

Six instructions are required, but the four temporary values can be held in the pipe so only 16 bytes are required to encode the sequence.

| | | | | | Encoding | | | | |
|---|---|---|---|---|---|---|---|---|---|
| No | Assembly | L | T | Field 1 | Field 2 | Field 3 | Field 4 | PAD | Format |
| 1 | sub*,Rc,Rd | 2 | 1 | sub | | Rc | Rd | 0 | 8 |
| 2 | add*,Ra,Rb | 2 | 1 | add | | Ra | Rb | 0 | 8 |
| 3 | sub*,Rg,Rf | 2 | 1 | sub | | Rg | Rh | 0 | 8 |
| 4 | add*,Re,Rf | 2 | 1 | add | | Re | Rf | 0 | 8 |
| 5 | mul Ra,*,* | 1 | 0 | mul | Ra | | | | 2 |
| 6 | div Re,*,* | 1 | 0 | div | Re | | | | 2 |

Interated Vector Interleaving

If the desired operation is $$Ra[Ri]=(Ra[Ri]+Rb[Ri])\times(Rc[Ri]-Rd[Ri])$$

$Re[Ri]=(Re[Ri]+Rf[Ri])/(Rg[Ri]-Rh[Ri])$

Where registers Ra though Rh hold the base address of 8 arrays of size 1000 entries and register Ri contains an index ranging from 0 though 999.

Conventional 21 instructions are required, with 14 temporary registers encoded in 84 bytes

| No | Assembly |
|---|---|
| 1 | movRi,999 |
| 2 | movRt,1000 |
|   | LABEL: |
| 3 | sub Rt,Rt,1 |
| 4 | ldv R0,Rd,Ri |
| 5 | ldv R1,Rc,Ri |
| 6 | ldv R2,Rb,Ri |
| 7 | ldv R3,Ra,Ri |
| 8 | sub R8,R1,R0 |
| 9 | add R9,R3,R4 |
| 10 | ldv R4,Rh,Ri |
| 11 | ldv R5,Rg,Ri |
| 12 | mul R12,R9,R8 |
| 13 | sub R10,R5,R4 |
| 14 | ldv R6,Rf,Ri |
| 15 | ldv R7,Re,Ri |
| 16 | stv R12,Ra,Ri |
| 17 | add R11,R7,R6 |
| 18 | div R13,R11,R10 |
| 19 | sub Ri,Ri,1 |
| 20 | stv R13,Re,Rt |
| 21 | jnz Rt,LABEL |

Figure 5:
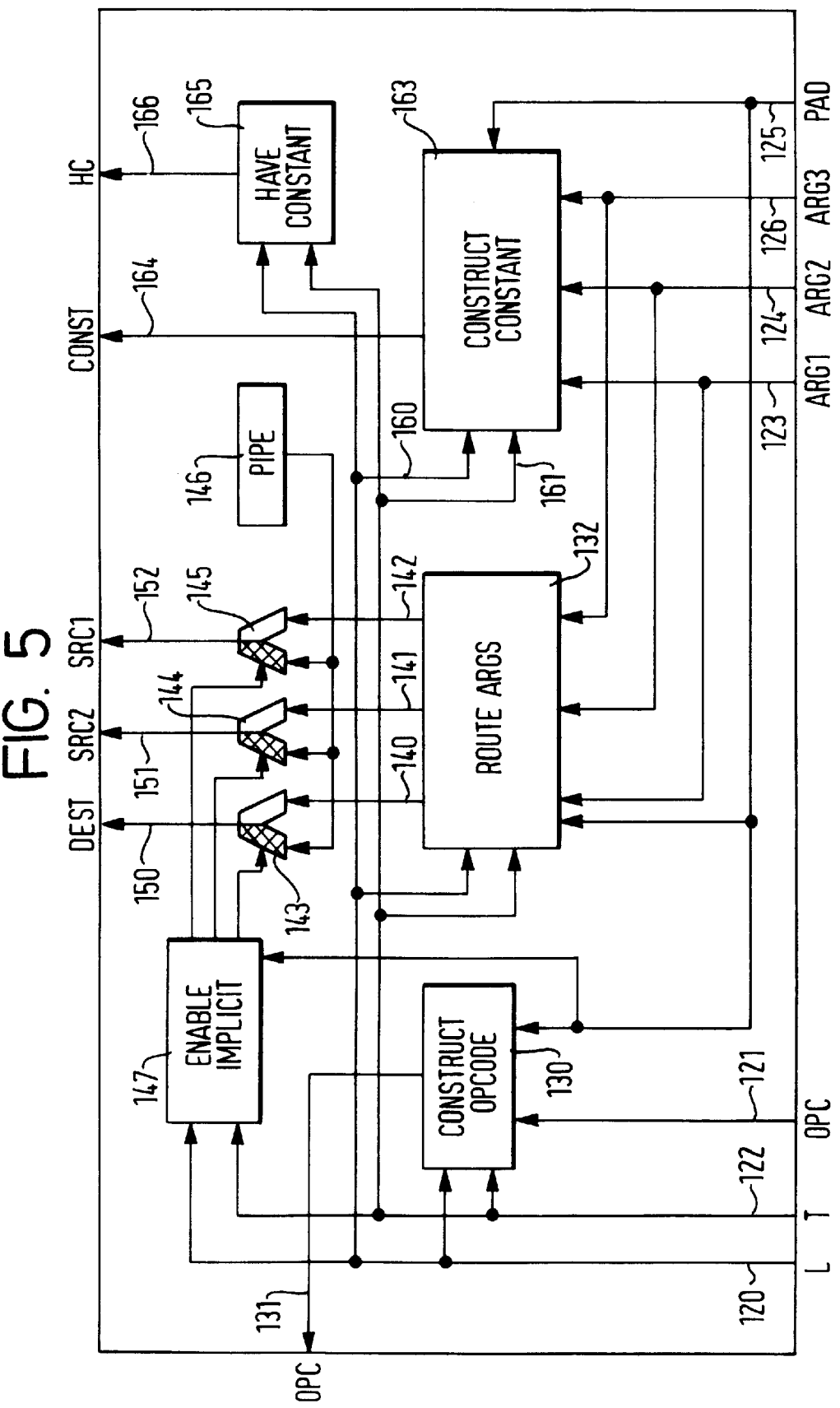
FIG. 5 shows more detail of the instruction expansion unit shown in FIG. 3.
Figure 6:
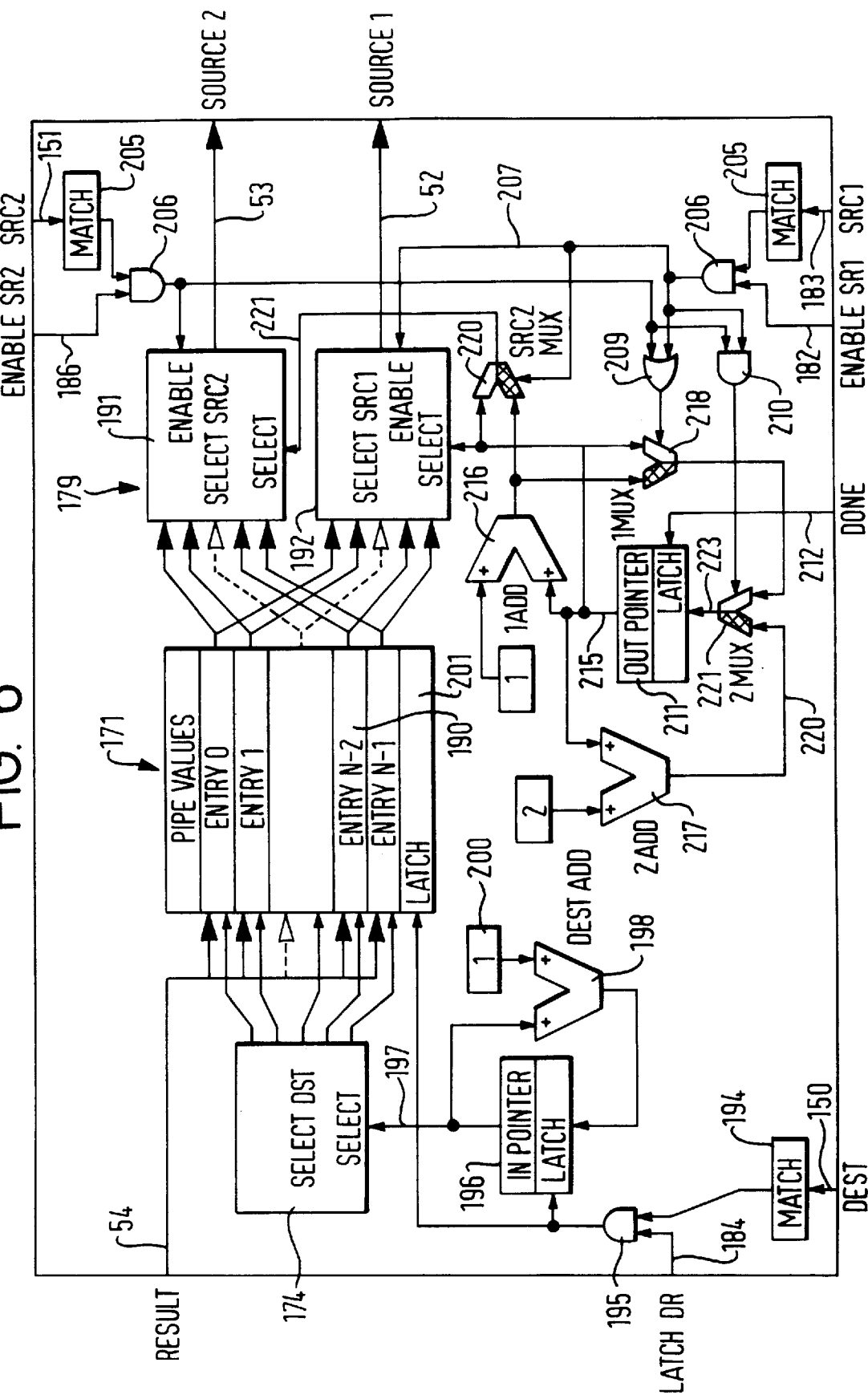
FIG. 6 shows in more detail the pipe unit of FIG. 3.

THIS EXAMPLE 21 instructions are required, but because of the instruction compression only these can be encoded in 56 bytes.

replace FIGS. 5 and 6. In this alternative, the expansion unit 63 is arranged to provide source and destination addresses which are cyclical so that they may operate on a first in first out basis and use some of the register file locations in place of the pipe 171. Similar components in FIG. 7 to those already described in FIGS. 5 and 6 have been marked with the same reference numerals and their function will not be repeated. In this case the In Pointer 196 and Out Pointer 211 are latches which can hold a number between N and N+M-1 inclusive. These are the register numbers in the register file 170 which can be used as a circular buffer to replace the requirement for the separate pipe 171. In this way the source and destination selectors on the register file 170 can select some of the registers in a normally addressed manner and other registers will be accessed on a cyclical circular buffer basis. The outputs 140, 141 and 145 from the router 132 are provided respectively to multiplexers 266, 267 and 268. Multiplexer 268 is arranged to provide the source 1 output signal 152. Multiplexer 267 provides the output signal for source 2 and multiplexer 266 provides an output to a further multiplexer 270 which has as its output the destination address. Each of the output signals 140, 141 and 145 is fed to a similar comparator circuit 271 which compares the register numbers for each operand from the router 132 and asserts a signal if it matches the special register number denoting the pipe. This special register number is defined to be any of the M registers making up the circular buffer as they do not need to be directly accessed. The output of comparators 271 are each fed to an OR gate 272 having as a second input a signal from the enable implicit circuit 147. Multiplexer 268 has a second input from the Out Pointer 211. The multiplexer 267 has a second input from a multiplexer 274 arranged to receive either the output of pointer 211 or an increment of 1 to that pointer value. Similarly multiplexer 266 receives an input from a multiplexer 275 which receives an output from multiplexer 274 or an increment of 1 on that value. The input address to pointer 211 is derived from a multiplexer 276 which has as its inputs either

|    |            |   |   | Encoding |         |         |         |     |        |
|----|------------|---|---|---------|---------|---------|---------|-----|--------|
| No | Assembly   | L | T | Field 1 | Field 2 | Field 3 | Field 4 | PAD | Format |
| 1  | movRi,999  | 3 | 2 | mov     | Ri      | 7       | 0       | 15  | 14     |
| 2  | movRt,1000 | 3 | 2 | mov     | Rt      | 8       | 0       | 15  | 14     |
|    | LABEL:     |   |   |         |         |         |         |     |        |
| 3  | sub Rt,Rt,1 | 3 | 1 | sub    | Rt      | Rt      | 1       | 0   | 13     |
| 4  | ldv *,Rd,Ri | 2 | 1 | ldv    |         | Rd      | Ri      | 8   |        |
| 5  | ldv *,Rc,Ri | 2 | 1 | ldv    |         | Rc      | Ri      | 8   |        |
| 6  | ldv *,Rb,Ri | 2 | 1 | ldv    |         | Rb      | Ri      | 8   |        |
| 7  | ldv *,Ra,Ri | 2 | 1 | ldv    |         | Ra      | Ri      | 8   |        |
| 8  | sub*,*,*   | 0 |   | sub     |         |         |         |     | 1      |
| 9  | add*,*,*   | 0 |   | add     |         |         |         |     | 1      |
| 10 | ldv *,Rh,Ri | 2 | 1 | ldv    |         | Rh      | Ri      | 8   |        |
| 11 | ldv *,Rg,Ri | 2 | 1 | ldv    |         | Rg      | Ri      | 8   |        |
| 12 | mul*,*,*   | 0 |   | mul     |         |         |         |     | 1      |
| 13 | sub*,*,*   | 0 |   | sub     |         |         |         |     | 1      |
| 14 | ldv *,Rf,Ri | 2 | 1 | ldv    |         | Rf      | Ri      | 8   |        |
| 15 | ldv *,Re,Ri | 2 | 1 | ldv    |         | Re      | Ri      | 8   |        |
| 16 | stv *,Ra,Ri | 2 | 1 | stv    |         | Ra      | Ri      | 8   |        |
| 17 | add*,*,*   | 0 |   | add     |         |         |         |     | 1      |
| 18 | div *,*,*  | 0 |   | div     |         |         |         |     | 1      |
| 19 | sub Ri,Ri,1 | 3 | 1 | sub    | Ri      | Ri      | 1       | 0   | 13     |
| 20 | stv *,Re,Rt | 2 | 1 | stv    |         | Re      | Rt      | 8   |        |
| 21 | jnz Rt,LABEL | 3 | 2 | jnz   | R2      | 16      | 63      | 15  | 14     |

Figure 7:
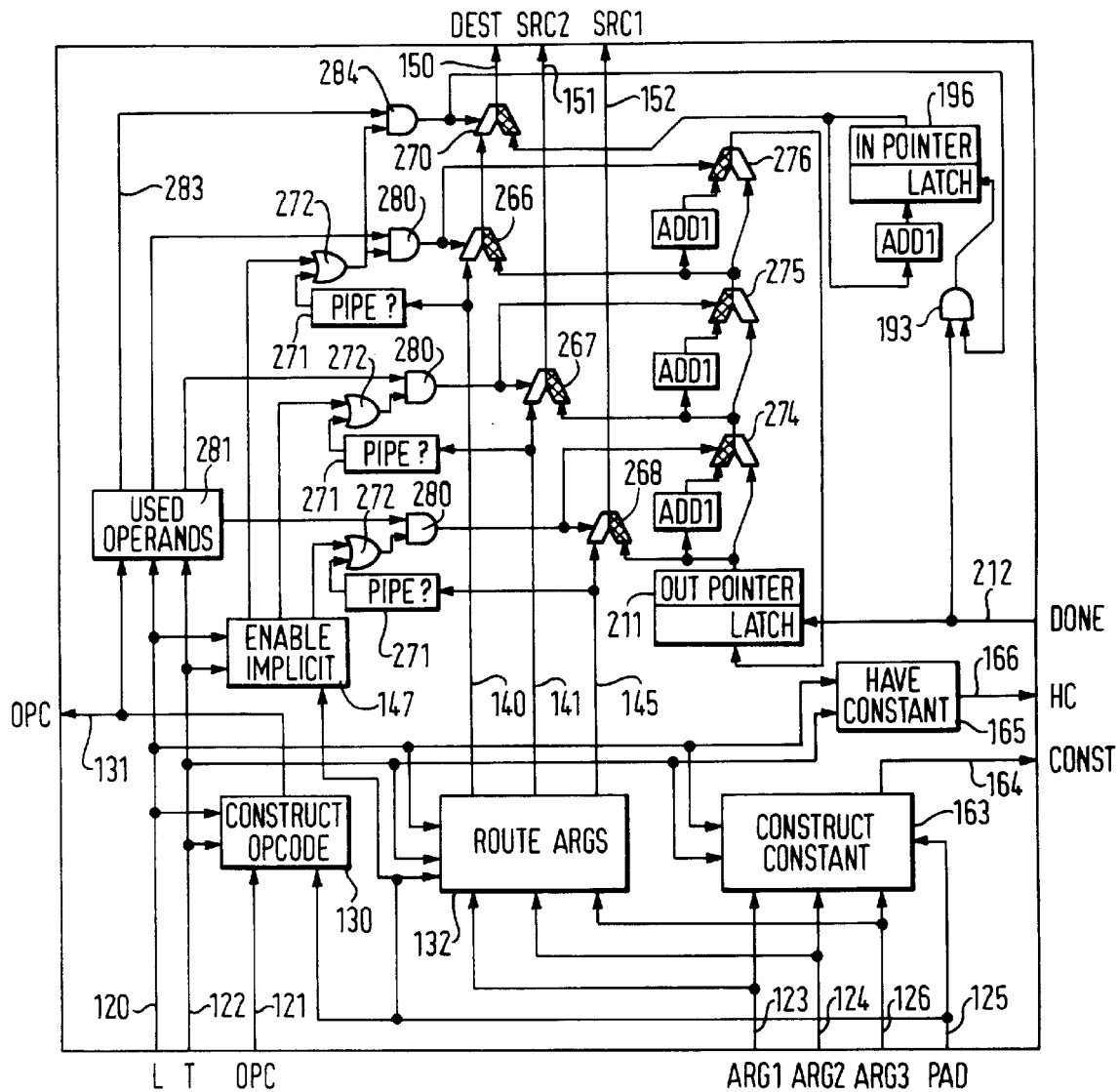
FIG. 7 shows a modified arrangement for the circuitry of FIG. 5.

The invention is not limited to the details of the foregoing examples. FIG. 7 illustrates an alternative arrangement to the output of multiplexer 275 or an increment of 1 on that output value. The OR gates 272 are arranged to provide a first output to a respective AND gate 280 arranged to receive a second input from a Used operands circuit 281. The Used operand 281 receives inputs of the opcode signal 131 as well as the length and type signals 120 and 122. Outputs from circuit 281 indicate which of the three Operands are sources and which is the destination. Its outputs are fed to the AND gates 280 to permit appropriate selection of the multiplexers 268, 267 and 266. A further output 283 from the used Operand circuit 281 is fed to a further AND gate 284 which receives a second input from the OR gate 272. This controls the multiplexer 270 to permit the destination output to be derived either from the in pointer 196 or from the multiplexer 266. It will be seen that each of the ADD one units performs a modulo addition of the input signals so that when presented with the value N+M−1 the result is N. The Done signal 212 controls latching of the Out pointer 211 and In pointer 196 so as to update these pointers when execution of an instruction is completed. AND gate 193 only allows update of In Pointer 196 when a value has been read from the pipe, as indicated by AND gate 284. In this way selected registers in the register file may be used as a circular buffer to act as a first in first out multiple value data store and by use of the enable implicit circuit 147 this may be effected even when the length and type signals 120 and 122 indicate that a source or destination address is omitted in the compressed instruction.

In the examples described with reference to FIG. 2, any omitted field is deemed to represent the implicit store provided by the pipe 171. In this way, when the compressed instruction is expanded the omitted field is replaced by a value representing the address of the pipe 171. However, in an alternative embodiment an omitted field may be deemed to take the same value as one of the included fields. The length and type indicators used in the instruction format may indicate that the value of one of the included fields is to be repeated on expansion of the instruction to provide the same output value for that field as a designated one of the included fields. The instruction format may use bit values in the length and type indicator as well as possibly the PAD section of the instruction format in order to indicate which of the included fields is to have its value repeated and which omitted field is to take that repeated value. In FIG. 2 any of formats 6 to 11 have enough bits in the Opcode extension positions (bits numbers 22 or 23) to provide an indication that the expansion unit should copy the value of one of the included fields into an omitted field.

What is claimed is:

1. A computer system comprising:
    a processor for processing a plurality of uncompressed instructions having a common format of predetermined bit length and a predetermined sequence of instruction fields each of a respective predetermined bit length;
    storage circuitry holding information designating a storage location;
    logic circuitry adapted to respond to a compressed instruction set comprising a plurality of compressed instructions of different bit length, each compressed instruction being based on the common format but omitting at least one field thereof, and including control bits indicative of a length of each compressed instruction and a type of each compressed instruction;
    the logic circuitry being adapted to:
        receive a first of the plurality of compressed instructions in response to a parameter for executing the first of the plurality of compressed instructions;
        process the control bits of the first compressed instruction to determine the field that is omitted;
        retrieve the information from the storage circuitry on the basis of the field that is omitted, and restoring the omitted field on the basis of the information to obtain one of the plurality of uncompressed instructions; and
        output the one of the plurality of uncompressed instructions to the processor for execution.

2. The computer system according to claim 1, wherein at least one of the omitted fields is an identifier for a data holding location.

3. The computer system according to claim 2, wherein at least one of the omitted fields identifies a register.

4. The computer system according to claim 2, wherein at least one of the omitted fields identifies a first in first out data store configured to hold a plurality of data values.

5. A computer system according to claim 1 in which the omission of any selected field designates said storage location not requiring address data in the instruction, and said logic circuitry is arranged to access said storage location in response to the omission of each omitted field.

6. The computer system according to claim 1, wherein said storage circuitry stores information identifying a first in first out data store configured to hold a plurality of data values.

7. The computer system according to claim 1, wherein the processor is adapted to execute the uncompressed instruction, and wherein one of said instruction fields defines an operation code identifying the operation to be carried out by the execution of the instruction.

8. The computer system according to claim 7, wherein said instruction fields in said format of predetermined bit length provide indications of two data source locations indicating a source of data for use in executing the instruction, and a data destination location indicating a destination of a result of executing the instruction.

9. The computer system according to claim 1, wherein each instruction has a bit length equal to an integral number of bytes and each field has a bit length less than one byte.

10. The computer system according to claim 9, wherein said format of predetermined bit length is four bytes long.

11. The computer system according to claim 1, wherein selected instructions omit a plurality of said fields and said control bits provide an indication of each omitted field.

12. A method of executing compressed instructions in a computer system, the method comprising acts of:
    storing a plurality of compressed instructions of different bit length, each of compressed instructions being based on a common respective format of an uncompressed instruction having a predetermined bit length and a predetermined sequence of instruction fields each of a respective predetermined bit length, each compressed instruction omitting at least one field of the corresponding uncompressed instruction and including control bits indicating a length of the compressed instruction and a type of the compressed instruction;
    receiving a first of the compressed instructions in response to a parameter for executing the first compressed instruction;
    processing the control bits of the first compressed instruction to determine the at least one omitted field;
    retrieving information from storage circuitry on the basis of the omitted field, the information designating a storage location;
    restoring the omitted field on the basis of the information to obtain a first uncompressed instruction; and
    executing the first uncompressed instruction.

13. A method according to claim 12 further comprising indicating the length of each instruction and identifying which fields are present or omitted from each instruction by control bits included in each instruction in addition to said fields.

14. A method according to claim 12 wherein the omission of any selected field designates said storage location and said storage location is accessed in response to detecting omission of the or each omitted field in the instruction.

15. A method according to claim 14 wherein said storage location comprises a data store arranged to hold simultaneously a plurality of data values on a first in first out basis and said access of said storage location comprises writing data into or obtaining data from said storage location.

16. A method according to claim 12 wherein the significance of an included field is determined by said control bits.

17. A method of executing compressed instructions in a computer system, the computer system including a processor adapted to process uncompressed instructions having a common format of predetermined bit length and a predetermined sequence of instruction fields each of a respective predetermined bit length, storage circuitry adapted to hold information designating a storage location, and logic circuitry adapted to respond to a compressed instruction set comprising a plurality of selectable compressed instructions of different bit length, each compressed instruction being based on the common format but omitting at least one field thereof, each compressed instruction including control bits indicative of a length of a respective compressed instruction and a type of the respective compressed instruction, the method comprising acts of:

receiving, in the logic circuitry, a first of the compressed instructions in response to a parameter for executing the compressed instruction;

processing the control bits indicative of the length of the compressed instruction and a length of the compressed instruction and determining, in response to the control bits, the at least one omitted field;

retrieving the information from the storage circuitry on the basis of the omitted field;

restoring the omitted field based on the information to obtain a first uncompressed instruction;

outputting the first uncompressed instruction to the processor; and executing the first uncompressed instruction in the processor.

18. A method according to claim 17, wherein the step of expanding the bit length of the instruction includes restoring the omitted field by repeating for the omitted field the bit value of an included field.

19. A method according to claim 17 wherein the omission of any selected field designates said storage location and said storage location is accessed in response to detecting omission of the or each omitted field in the instruction.

20. A method according to claim 17 wherein the significance of an included field is determined by said control bits.

* * * * *